United States Patent [19]

Araki et al.

[11] Patent Number: 5,243,386
[45] Date of Patent: Sep. 7, 1993

[54] OPTICAL SYSTEM HOUSING STRUCTURE FOR IMAGE FORMING APPARATUS

[75] Inventors: Takahisa Araki; Yoshihiro Nakayama; Kinya Sasai, all of Utsunomiya, Japan

[73] Assignee: Matsushita Electric Industrial Co., Ltd., Osaka, Japan

[21] Appl. No.: 686,979

[22] Filed: Apr. 18, 1991

[30] Foreign Application Priority Data

| Apr. 19, 1990 | [JP] | Japan | 2-103918 |
| May 22, 1990 | [JP] | Japan | 2-132240 |
| May 22, 1990 | [JP] | Japan | 2-132241 |

[51] Int. Cl.⁵ .................................. G03G 15/04
[52] U.S. Cl. .................................. 355/215; 355/233
[58] Field of Search ............... 355/215, 233, 200, 210, 355/235, 133, 30; 174/50, 52.1; 361/390, 429

[56] References Cited

U.S. PATENT DOCUMENTS

| 3,386,606 | 6/1968 | Pastrick | 174/50 X |
| 3,564,112 | 2/1971 | Algotsson | 361/356 X |
| 4,198,156 | 4/1980 | Barker et al. | 355/30 |
| 4,286,861 | 9/1981 | Matsumoto | 355/215 |
| 4,647,178 | 3/1987 | Sasaki et al. | 355/200 |
| 4,695,151 | 9/1987 | Watanabe | 355/30 X |
| 4,847,643 | 7/1989 | Ohmori | 355/233 X |
| 4,912,563 | 3/1990 | Narita | 355/200 X |
| 4,931,836 | 6/1990 | Matsushita et al. | 355/233 |
| 5,073,796 | 12/1991 | Suzuki et al. | 355/215 |

FOREIGN PATENT DOCUMENTS

| 0153824 | 9/1985 | European Pat. Off. . |
| 0269131 | 6/1988 | European Pat. Off. . |
| 54-31740 | 8/1979 | Japan . |
| 0017957 | 1/1982 | Japan | 355/215 |
| 0200070 | 12/1982 | Japan | 355/215 |
| 62-10423 | 3/1987 | Japan . |
| 62-296166 | 12/1987 | Japan . |
| 63-199376 | 8/1988 | Japan . |

*Primary Examiner*—A. T. Grimley
*Assistant Examiner*—Robert Beatty
*Attorney, Agent, or Firm*—Lowe, Price, LeBlanc & Becker

[57] ABSTRACT

An image forming apparatus such as an electrophotographic copying machine includes an optical system for housing a scanning exposure optical system. The optical system housing has air inlet and outlet holes for introducing air into and discharging air from the optical system housing. The air outlet holes have an opening area greater than an opening area of the air inlet holes. Electrostatic filters are mounted on the optical system housing in covering relation to the air inlet and outlet holes. Thus, the optical system housing is substantially closed. The optical system housing is composed of surrounding walls having ends joined in pairs in interdigitating relationship, one of the ends in each of the pairs having an end surface held in abutment against an inner surface of the surrounding wall having the other end. An image forming mechanism is housed in an image forming mechanism housing having a pair of confronting side walls spaced from each other. One of the side walls is taller than the other side wall, and has support fingers projecting laterally from an inner surface. The optical system housing is supported on the support fingers and the other side wall.

1 Claim, 4 Drawing Sheets

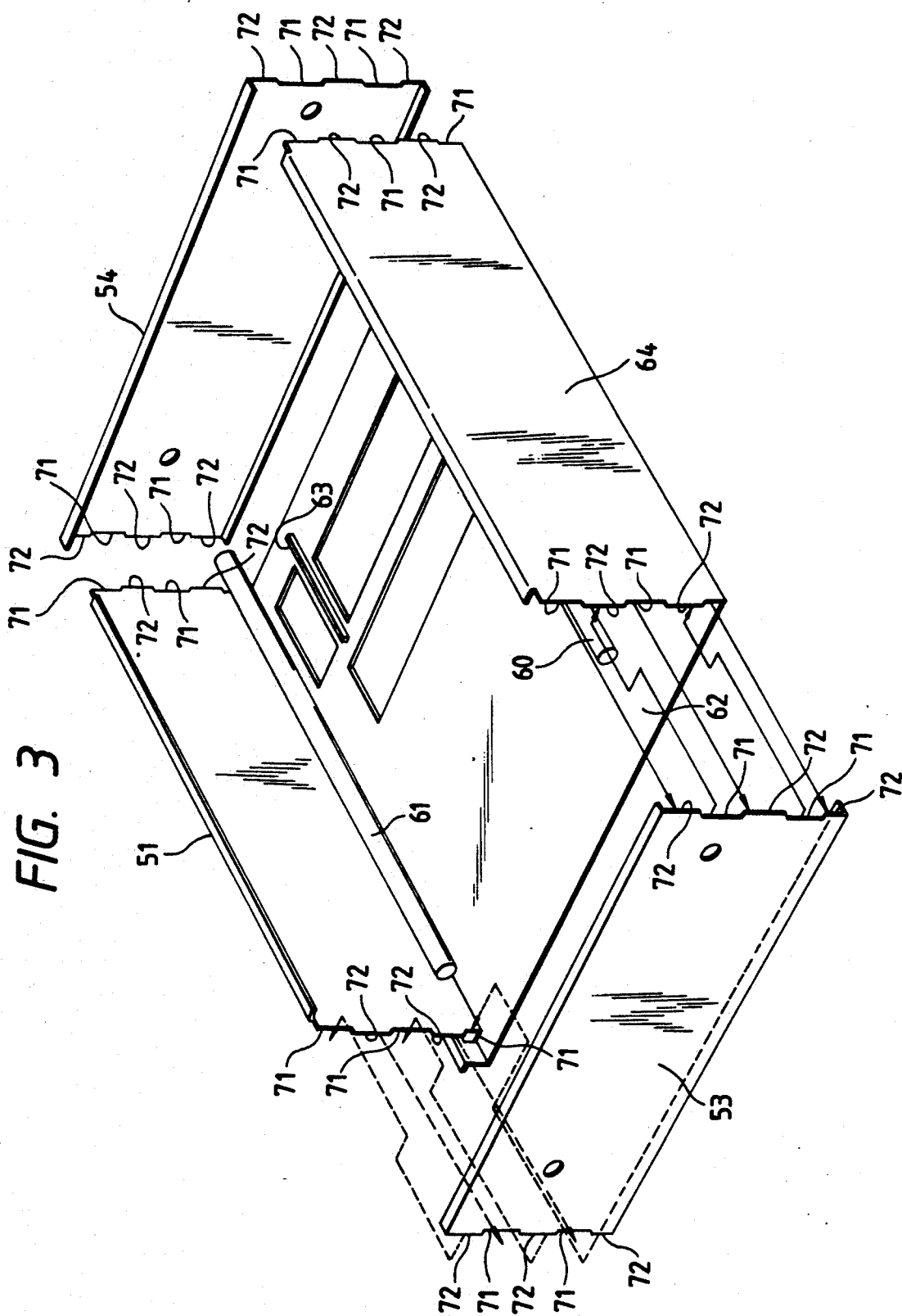

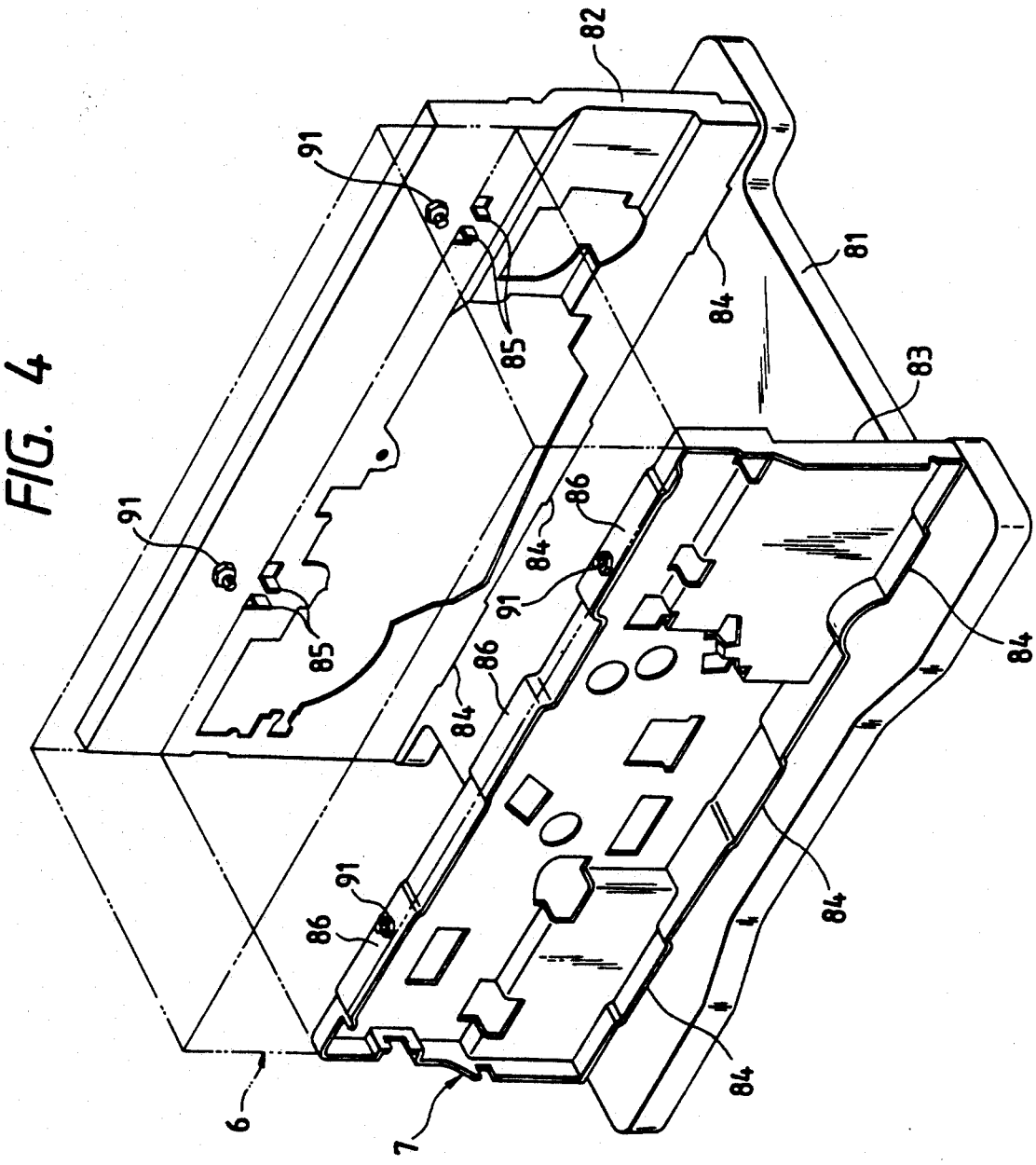

OPTICAL SYSTEM HOUSING STRUCTURE FOR IMAGE FORMING APPARATUS

BACKGROUND OF THE INVENTION

1. Field of the Invention

The present invention relates to an optical system housing structure for use in an electrophotographic image forming apparatus such as a photocopying machine.

2. Prior Art

Electrophotographic image forming apparatus such as photocopying machines, laser beam printers, or the like are widely used in offices and other applications. As disclosed in Japanese Patent Publication No. 62-10423, most of such electrophotographic image forming apparatus have a housing structure which comprises a housing that contains an image forming mechanism including a photosensitive body and another housing that accommodates a scanning exposure optical system for optically scanning a subject and exposing the photosensitive body to an optical image of the subject. The housing which houses the scanning exposure optical system is placed on and fixed to the housing which houses the image forming mechanism. These housings are basically optically independent of, or isolated from, each other so that no light from a light source for applying scanning light to the subject in the exposure optical system will directly fall on the photosensitive body, thus preventing noise from being included in the final image. The independent housings can be installed and removed separately from each other.

The housing which houses the scanning exposure optical system, hereinafter referred to as the "optical system housing", including a glass platen for supporting the subject on its upper surface, tends to be heated to high temperature, making the user feel anxious about the condition of the scanning exposure optical system or sometimes making the user feel hot. Heretofore, external air is introduced into the optical system housing to cool the internal scanning exposure optical system and the glass platen so that they will not be unduly heated. The cooling air is forcibly delivered into the optical system housing by a fan. The optical system housing has an air inlet for introducing the cooling air and an air outlet for discharging the air after it has cooled the scanning exposure optical system and the glass platen. The air inlet is equipped with a filter for preventing dust from entering the optical system housing through the air inlet. The air outlet is usually left open without any filter.

It is known that the quality of images produced by the image forming apparatus is gradually degraded with time. The experience of the inventors indicates that the timedependent image quality deterioration takes place irrespectively of whether the image forming apparatus has been used frequently or not, and is caused due primarily to dust applied to optical surfaces of some optical components, such as mirrors, of the scanning exposure optical system. Small dust particles, which are invisible to human eyes, are suspended in air continuously for a long period of time, flow through narrow gaps, and are attached to the optical components. Even though those dust particles are small in size, they bring about a loss of light intensity when deposited to a certain thickness.

It is necessary that the optical components of the scanning exposure optical system be supported such that they can move for the scanning of the subject while remaining parallel to each other and to the photosensitive body or being kept at suitable distances from each other and from the photosensitive body. If the optical components are not properly held parallel to, or spaced from, each other and the photosensitive body, then the sharpness of generated images is gradually lowered, resulting in a image quality reduction. The optical system housing comprises surrounding side walls simply put together and joined together by arc welding. These surrounding side walls themselves do not have any means for keeping them perpendicularly to each other and also to a bottom panel. Therefore, certain jigs are necessary to position the side walls in order to hold them perpendicularly to each other and to the bottom panel when the side walls are joined together. The cost of the optical system housing thus constructed is relatively high because the side walls and the bottom panel are assembled using many jigs and the assembling procedure is complex. The complex assembling procedure is liable to impair the perpendicularity to be achieved between the walls. When the assembled walls are joined by arc welding, the desired perpendicularity may be lost due to the thermal strain of the walls. After the optical system housing has been assembled and welded, it has to be adjusted or finished for desired perpendicularity. The finishing process is tedious and time-consuming, and adds to an increase in the cost.

The various components are housed in the housings in accurate positions and with accurate attitudes. Unless the housings are coupled to each other in an accurate position and with an accurate attitude, however, the optical images cannot be formed on the photosensitive body by the scanning exposure optical system.

It is highly difficult to accurately align the upper edges of side walls of the housing which houses the image forming mechanism, hereinafter referred to as the "image forming mechanism housing", for supporting the optical system housing.

Heretofore, the optical system housing is fixedly mounted on the image forming mechanism housing after the upper edges of the side walls of the image forming mechanism housing have been adjusted in height.

However, a complicated position adjusting process is required to adjust the upper edges of the side walls of the image forming mechanism housing, and hence the housings cannot easily be assembled together. No positional reference is provided by either the image forming mechanism housing or the optical system housing when the upper edges of the side walls of the image forming mechanism housing are adjusted in height. After the adjusting process, the optical system housing is positionally adjusted back and forth and laterally on the image forming mechanism housing, and then the housings are joined to each other while being maintained in proper relative positions. Accordingly, it requires skill and time to assemble and join the housings, and the overall assembling and joining process is relatively costly.

SUMMARY OF THE INVENTION

It is an object of the present invention to provide an optical system housing structure for image forming apparatus which will solve the problems of the conventional optical system housing structure, the optical system housing structure being substantially closed but allowing ventilation for cooling a scanning exposure optical system and a glass platen.

Another object of the present invention is to provide an optical system housing structure whose surrounding walls can easily be joined, without using jigs, for desired perpendicularity therebetween.

Still another object of the present invention is to provide an optical system housing structure including an image forming mechanism housing and an optical system housing, the image forming mechanism housing being of an improved structure for supporting the optical system housing thereon.

According to the present invention, there is provided an optical system housing structure for use in an image forming apparatus, comprising an optical system housing for housing a scanning exposure optical system, the optical system housing having air inlet and outlet holes defined therein for introducing air into and discharging air from the optical system housing, and electrostatic filters mounted on the optical system housing in covering relation to the air inlet and outlet holes, for filtering the air to be introduced into the optical system housing through the air inlet hole, whereby the optical system housing being substantially closed.

The optical system housing is composed of surrounding walls having ends joined in pairs in interdigitating relationship, one of the ends in each of the pairs having an end surface held in abutment against an inner surface of the surrounding wall having the other end.

An image forming mechanism housing for housing an image forming mechanism has a pair of confronting side walls spaced from each other, one of the side walls being taller than the other side wall, and having support fingers projecting laterally from an inner surface thereof. The optical system housing being supported on the support fingers and the other side wall.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is an exploded perspective view showing the manner in which the optical system housing is assembled; and FIG. 4 is a perspective view of an image forming mechanism housing on which the optical system housing is to be placed.

DETAILED DESCRIPTION

Figure 1:
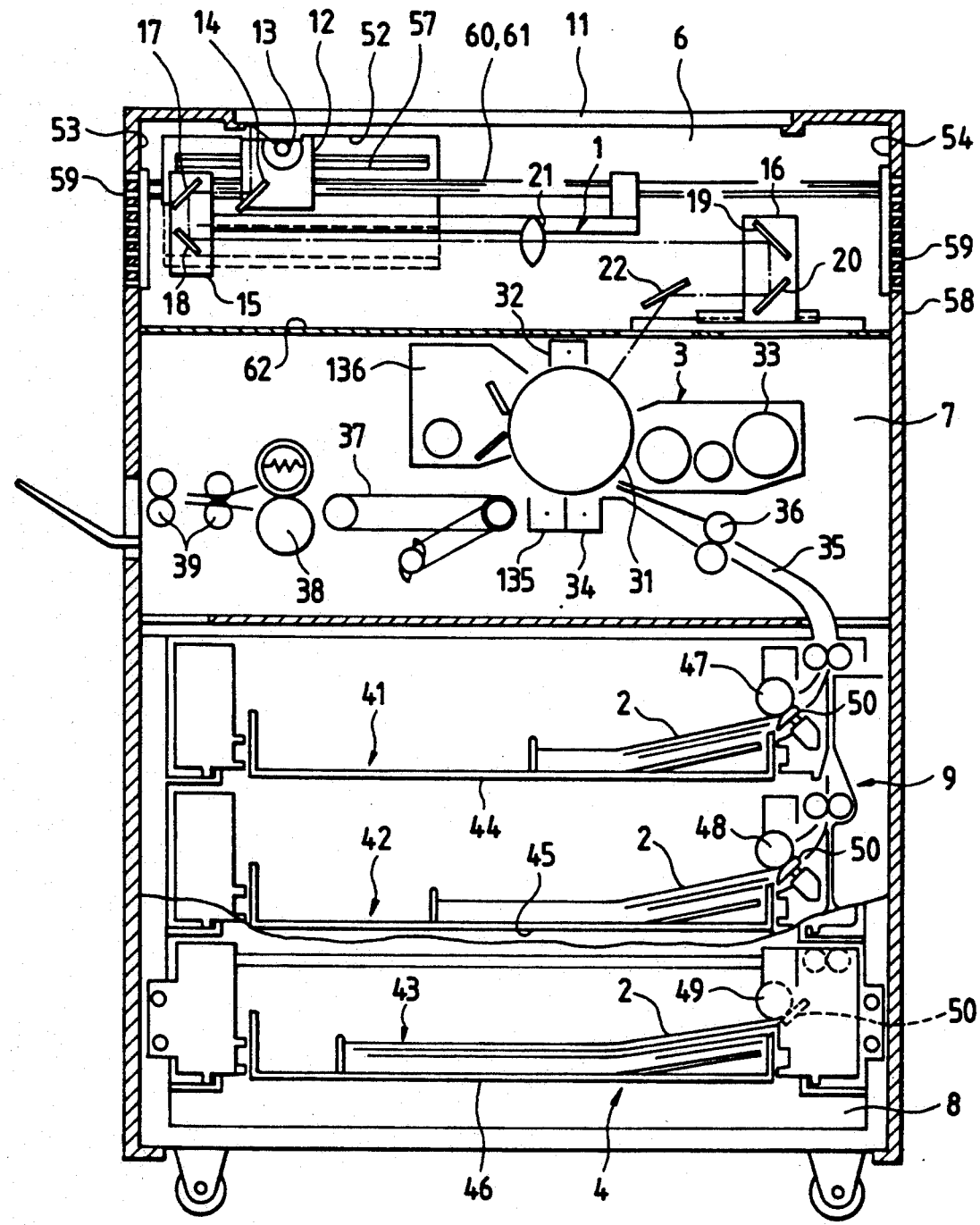
FIG. 1 is a vertical cross sectional view of a photocopying machine which has an optical system housing structure according to the present invention.

FIG. 1 shows in vertical cross section an electrophotographic photocopying machine as an image forming apparatus which has an optical system housing structure according to the present invention. The photocopying machine comprises a scanning exposure optical system 1, an image forming mechanism 3 for producing an image through exposure by the scanning exposure optical system 1 and transferring the image to an image transfer sheet 2, and a sheet feed mechanism 4 for feeding an image transfer sheet 2 to the image forming mechanism 3. The scanning exposure optical system 1, the image forming mechanism 3, and the sheet feed mechanism 4 are housed respectively in an optical system housing 6, an image forming mechanism housing 7, and a sheet feed mechanism housing 8, which are independent of each other. The optical system housing 6 is placed on the image forming mechanism housing 7 which is positioned on the sheet feed mechanism housing 8. These housings 6, 7, 8 which are thus stacked is coupled together, thus providing a machine frame 9.

The scanning exposure optical system 1 has a lamp 13 for applying scanning line to a subject (not shown) on a glass platen 11, the lamp 13 being supported on a first slider 12 movable below the glass platen 11. Light reflected from the subject on the glass platen 11 is reflected by a first mirror 14 supported on the first slider 13. A second slider 15 is also movable below the glass platen 11 and supports second and third mirrors 17, 18. Fourth and fifth mirrors 19, 20 are supported on a third slider 16 movably disposed below the glass platen 11. The second through fifth mirrors 17 through 20 serve to keep a constant optical path for the light reflected from the first mirror 14. The scanning exposure optical system 1 also has a projection lens 21 disposed between the third and fourth mirrors 18, 19. A sixth mirror 22 disposed near the fifth mirror 20 serves to correct the length of the optical axis when the magnification is varied by movement of the projection lens 21 along its optical axis.

The image forming mechanism 3 comprises a photosensitive drum 31, a charging charger 32, an image developing unit 33, a transfer charger 32, a separation charger 135, and a cleaning unit 136, which are successively disposed around the photosensitive drum 31. The image forming mechanism 32 operates according to the known electrophotographic process, i.e., forms a toner image on the photosensitive drum 31 based on an electrostatic latent image formed thereon, and transfers the toner image onto a transfer sheet 2 supplied to the photosensitive drum 31.

A sheet feed path 35 extends from the sheet feed mechanism 4 to an image transfer region where the photosensitive drum 31 and the transfer charger 34 confront each other. The sheet feed path 35 serves to supply a transfer sheet 2 from the sheet feed mechanism to the image transfer region. The sheet feed path 35 has a pair of timing rollers 36. When the timing rollers 36 are at rest, a transfer sheet 2 is fed to the timing rollers 36, and has its leading edge aligned thereby so that the transfer sheet 2 is corrected out of any skewed condition. Then, the timing rollers 36 are rotated to feed the transfer sheet 2 to the image transfer region. Therefore, the timing to supply the transfer sheet 2 to the image transfer region can be adjusted by the timing rollers 36.

The image forming mechanism 3 further includes a feed unit 37 comprising a feed belt for attracting and feeding the transfer sheet 2 onto which the toner image has been transferred. The toner image on the transfer sheet 2 is then fixed by a fixing unit 38. The transfer sheet 2 from the fixing unit 38 is discharged by discharge rollers 39.

The sheet feed mechanism 4 comprises three sheet feeders 41, 42, 43 storing transfer sheets 2 of different sizes. The transfer sheets 2 of different sizes are selectively fed from the sheet feeders 41, 42, 43 to the image forming mechanism 3 through the sheet feed path 35. The sheet feeders 41, 42, 43 have respective sheet cassettes 44, 45, 46 for storing transfer sheets, respective pickup rollers 47, 48, 49 for delivering transfer sheets from within the sheet cassettes 44, 45, 46, and respective separator pads 50 for separating the transfer sheets from each other so that they will be fed one at a time. The sheet feeders 41, 42, 43 are unitized as blocks, which can be replaced with other blocks. For example, two sheet feeders may be replaced with one sheet feeder which stores a greater number of sheets. The sheet cassettes 41, 42, 43 may be loaded and unloaded through a front panel of the machine frame 9, i.e., in directions toward and away from the viewer of FIG. 1.

Figure 2:
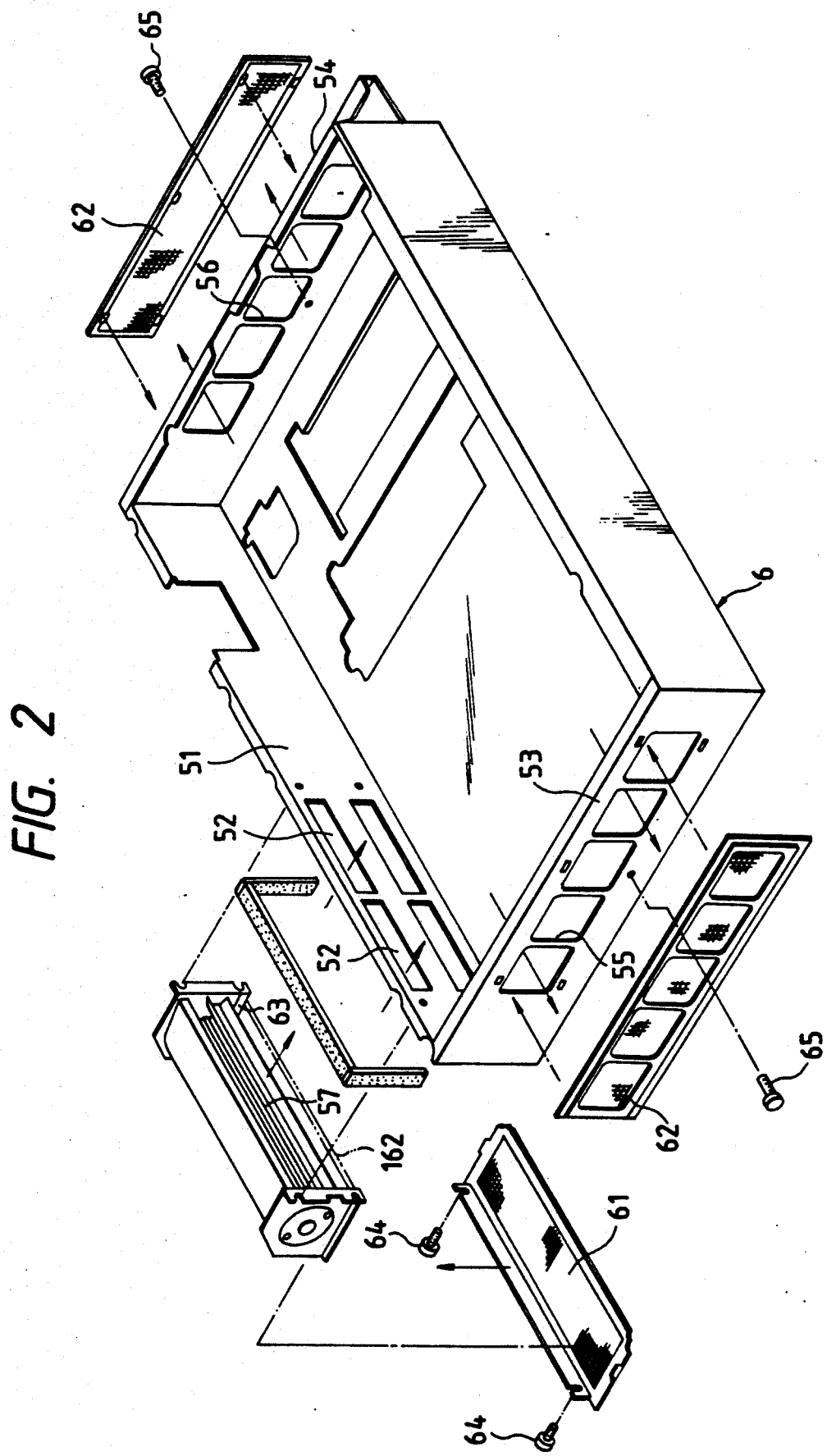
FIG. 2 is an exploded perspective view of an optical system housing.

As better shown in FIG. 2, the optical system housing 6 has air inlet holes 52 defined in a rear wall 51, and air outlet holes 55, 56 defined in lateral side walls 53, 54. An air blower fan 57 is mounted on the outside of the rear wall 51 over the air inlet holes 52, for introducing external air into the optical system housing 6 and discharging air from the optical system housing 6 through the air outlet holes 55, 56. When the air blower fan 57 is actuated, air flows as indicated by the arrows in FIG. 2, thus cooling the interior of the optical system housing 6. Therefore, even when the lamp 13 is heated, the glass platen 11 is prevented from being unduly heated, so that the operator will not feel anxious or hot. The air inlet holes 52 are positioned near the lamp 13 as it is in a home position before the scanning exposure optical system 1 starts to operate. Accordingly, the region in the optical system housing 6 where the lamp 13 is positioned more often and the temperature is higher, is effectively cooled by the cooling air introduced through the air inlet holes 52. Thus, the cooling efficiency of the scanning exposure optical system 1 is high.

The machine frame 9 is covered with a resin cover 58 which has air ventilation holes 59 (FIG. 1) defined therein in registry with the air inlet and outlet holes 52, 55, 56 for allowing air to be introduced into and discharged out of the optical system housing 6.

The interior of the optical system housing 6 may be cooled by air which is drawn into and discharged out of the optical system housing 6 under suction.

Since the interior of the optical system housing 6 is vent to atmosphere through the air inlet holes 52 and the air outlet holes 55, 56, dust would be introduced into the optical system housing 6, and deposited on the reflecting surfaces of the mirrors of the scanning exposure optical system 14, lowering the quality of the final images on transfer sheets 2. Particularly, small invisible dust particles which are suspended in air over a long period of time would enter the optical system housing 6 irrespective of whether the photocopying machine is used or not, impairing the scanning exposure optical system 1.

To avoid deposition of such small dust particles on the components of the scanning exposure optical system 1, electrostatic filters 61, 62 are disposed at the air inlet and outlet holes 52, 55, 56 for trapping small dust particles under electrostatic attractive forces. The electrostatic filters 61, 62 may be of a known nature disclosed in Japanese Patent No. 1102749, and are manufactured by Sumitomo 3M Co., Ltd. and Toyobo Co., Ltd.

The filter 61 is mounted over an air inlet port 162 of the air blower fan 57. The air blower fan 57 has guide slots 63 in which ends of the filter 62 are inserted. The filter 61 is fastened to the air blower fan 57 by screws 64. The filters 62 are disposed over the air outlet holes 55, 56 with positioning teeth engaging in corresponding slots in the side walls of the optical system housing 6, and are fastened to the sides walls 53, 54 by screws 65.

The air inlet holes 52 are relatively small because cooling air is forcibly introduced therethrough by the air blower fan 57 and should be applied intensively to the lamp 13 as it is in the home position. On the other hand, the air outlet holes 55, 56 are relatively large in order to cause cooling air to be dispersed in the optical system housing 6 and smoothly discharged from the optical system housing 6.

The total opening area of the air outlet holes 55, 56 is much larger than the total opening area of the air inlet holes 52. Accordingly, air flows through the air inlet holes 52 at a speed much higher than the speed at which air flows through the air outlet holes 55, 56. The electrostatic filters 61, 62 are constructed to induce different pressure losses with respect to such different air flow speeds in order to allow the cooling air to well cool the interior of the optical system housing 6 and also to cause the electrostatic filters 61, 62 to well trap dust particles regardless of the difference between the air flow speeds.

An experiment was conducted on an optical system housing of the above structure with the filter 61 made of DEL-20 manufactured by Sumitomo 3M Co., Ltd., and the filters 62 made of Type A, 100 g/m² manufactured by Toyobo Co., Ltd. The results of the experiment are as follows:

TABLE 1

|  | Dust collection efficiency (0.5~1 μm) E | |
|---|---|---|
|  | Air flow speed in the air outlet holes: 20 cm/s | Air flow speed in the air inlet holes: 100 cm/s |
| DEL-20 (Sumitomo 3M) | 28% | 17% |
| Type A, 100 g/m² (Toyobo) | 36% | 5% |

TABLE 2

|  | Pressure loss ΔP | |
|---|---|---|
|  | Air flow speed in the air outlet holes: 20 cm/s | Air flow speed in the air inlet holes: 100 cm/s |
| DEL-20 (Sumitomo 3M) | 0.2 mm H2O | 1.9 mm H2O |
| Type A, 100 g/m² (Toyobo) | 0.4 mm H2O | 3.4 mm H2O |

As seen from Tables 1 and 2, the electrostatic filter of Sumitomo 3M in the air inlet port 162 was better with respect to the dust collection efficiency and the pressure loss, and the electrostatic filters 62 of Toyobo in the air outlet holes 55, 56 were better with respect to the dust collection efficiency.

The electrostatic filters of Sumitomo 3M and Toyobo were satisfactory with respect to cooling and dust removal capabilities. The electrostatic filters of Sumitomo 3M were effective for use in both the air inlet port 162 and the air outlet holes 55, 56.

As shown in FIGS. 1 and 3, the first slider 12 and the second slider 15 are guided by longitudinal guide bars 60, 61 extending between and attached to the side walls 53, 54, and the third slider 16 is guided by a guide rail 63 mounted on a bottom panel 62 of the optical system housing 6. The first through fifth mirrors 14, 17 through 20, which are supported on the first, second, and third sliders 12, 15, 16, should be held parallel to each other and also to the circumferential surface of the photosensitive drum 31 and should be spaced at given distances from each other and also from the circumferential surface of the photosensitive drum 31.

According to the illustrated embodiment of the present invention, the side walls 53, 54, the rear wall 51, and a front wall 64 of the optical system housing 6 are held well perpendicularly to each other, and also to the bottom panel 62, and the optical system housing 6 is placed on and fixed to the image forming mechanism housing 7 in an accurate position and with an accurate attitude.

More specifically, as shown in FIG. 3, the front wall 64 is integral with and bent upwardly from a front edge of the bottom panel 62. The side walls 53, 54 and the rear wall 51 are separate from the bottom panel 62 and hence the front wall 64. Each of the bottom panel 62, the side walls 53, 54, and the rear wall 51 is produced by blanking a metal sheet to a desired shape, and bending the blank to a final three-dimensional shape. The edges of the bottom panel 62, the side walls 53, 54, the rear wall 51, and the front wall 64 thus blanked are high in dimensional and positional accuracy.

The confronting ends of the walls 51, 53, 54, 64 are held in abutment against each other to position these walls relatively to each other, and each have alternate recesses 71 and positioning ridges 72. When the confronting ends of the walls 51, 53, 54, 64 abut against each other, the positioning ridges 72 are received and locked in the respective recesses 71 in interdigitating relationship as indicated by the solid- and broken-line arrows. Recessed surfaces of one end of one of the walls are held in abutment against the inner surface of another wall at its end. The confronting ends thus combined with each other are prevented from being vertically displaced in position by the ridges 72 locked in the recesses 71. In addition, the walls 51, 53, 54, 64 are held perpendicularly to each other and also to the bottom panel 62 by the abutting engagement between the confronting ends of the walls 51, 53, 54, 64 because the abutting ends are high in dimensional and positional accuracy.

Since accurate perpendicularity is obtained between the adjacent ones of the walls 51, 53, 54, 64, and also between the walls 51, 53, 54, 64 and the bottom panel 62. Therefore, the first through fifth mirrors 14, 17 through 20 which are supported in and guided with respect to the optical system housing are accurately held parallel to each other and also to the photosensitive drum 31 and spaced desired distances from each other and also from the photosensitive drum 31. Accordingly, the subject on the glass platen 11 can properly be scanned by the scanning exposure optical system 1.

The confronting ends of the walls 51, 53, 54, 64 are joined together by plasma welding, so that the perpendicularity between the walls 51, 53, 54, 64 and also between them and the bottom panel 62 is prevented from being thermally affected. The optical system housing 6 that has been assembled and welded is not required to be corrected or adjusted in angles between the walls 51, 53, 54, 64 and also between them and the bottom panel 62.

In the illustrated embodiment, only the front wall 64 is integral with the bottom panel 52. However, any one of the walls 51, 53, 54, 64 may be integral with the bottom panel 62, or they may be independent of the bottom panel 62. If more walls are integral with the bottom panel 62, then the optical system housing 6 is made up of a smaller number of components and can be assembled in a smaller number of steps, and the walls are positionally related to the bottom panel more accurately.

The optical system housing 6 of the above structure is placed on and fixed to the image forming mechanism housing 7, as shown in FIG. 4. The image forming mechanism housing 7 comprises a bottom panel 81, drawn from a metal sheet, and a pair of front and rear confronting side walls 82, 83, each drawn from a metal sheet, mounted vertically on the bottom panel 81 in spaced relationship to each other. The side walls 82, 83 are fastened to the bottom panel B1 by bolts and nuts (not shown). The side walls 82, 83 have positioning surfaces 84 projecting downwardly and held against the bottom panel 81, so that the side walls 82, 83 can easily be positioned relatively to the bottom panel 81. The bottom panel 81 and the side walls 82, 83 are thus coupled to each other in accurate relative positional relationship.

The front side wall 82 is taller than the rear side wall 83. The taller front side wall 82 has support fingers 85 pierced and raised with accuracy. The front side wall 82 also has an inner surface above the support fingers 85. One side of the optical system housing 6 is supported on the support fingers 85, and an outer surface of the supported side is held against the inner surface of the front side wall 82. The optical system housing 6 is therefore transversely positioned in a proper position and with a proper attitude easily by the inner surface of the front side wall 82. The rear side wall 83 has raised positioning surfaces 86 on its upper edge for supporting the opposite side of the optical system housing 6. By adjusting the height of the support fingers 85 and the positioning surfaces 86, the optical system housing 6 is also positioned vertically on the image forming mechanism housing 7 in a proper position and with a proper attitude. The optical system housing 6 is fastened to the image forming mechanism housing 7 by bolts and nuts 91.

The optical system housing 6 is easily placed on and fixed to the image forming mechanism housing 7 in a proper position and with a proper attitude, the first through fifth mirrors 14, 17 through 20 and the photosensitive drum 31 are maintained suitably parallel to each other and positioned appropriately relatively to each other. The high positional accuracy achieved between the components in the scanning exposure optical system 1 and the image forming mechanism 3 allows the image forming apparatus to produce images of high quality.

The position, number, and shape of the support fingers 85 of the front side wall 82 may be modified, and also the position, number, and shape of the positioning surfaces 86 of the rear side wall 83. The optical system housing 6 and the image forming mechanism housing 7 may be fastened to each other by any suitable fastening means other than the bolts and nuts 91.

The optical system housing structure according to the present invention may be incorporated in an image forming apparatus in which a scanning exposure optical system is fixed in position and a subject to be copied is moved over the scanning exposure optical system when the subject is scanned thereby. Air inlet holes should be defined in a position corresponding to the fixed scanning exposure optical system. The principles of the present invention are applicable to other image forming apparatus with scanning exposure optical systems which are heated in use.

Although a certain preferred embodiment has been shown and described, it should be understood that many changes and modifications may be made therein without departing from the scope of the appended claims.

What is claimed is:

1. An optical system housing structure for use in an image forming apparatus, comprising:

an optical system housing for housing a scanning exposure optical system;

said optical system housing having air inlet and outlet holes defined therein, said air inlet and outlet holes providing communication between the outer atmosphere and an interior of said optical system housing, said air outlet holes having an opening area greater than an opening area of said air inlet holes;

electrostatic filters mounted on said optical system housing in fully covering relation to said air inlet and outlet holes, for filtering the air to e introduced into said optical system housing through said air inlet holes at all times, whereby said optical system housing with said electrostatic filters form a substantially closed structure; and a lamp of said scanning exposure optical system mounted in said optical system housing and positionable in a home position before the scanning exposure optical system starts to operate, whereby said air inlet holes are arranged in said optical system housing near said home position to improve cooling efficiency of the scanning exposure optical system.

* * * * *